United States Patent [19]

Lutz et al.

[11] Patent Number: 4,880,863

[45] Date of Patent: Nov. 14, 1989

[54] POLYMER BLEND

[75] Inventors: Robert G. Lutz, Santa Rosa, Calif.; Edgar J. Smutny, Houston, Tex.

[73] Assignee: Shell Oil Company, Houston, Tex.

[21] Appl. No.: 211,626

[22] Filed: Jun. 27, 1988

[51] Int. Cl.$^4$ .......................... C08L 71/02; C08K 5/06
[52] U.S. Cl. ..................................... 524/377; 525/404; 525/539
[58] Field of Search ....................... 525/404, 187, 539; 524/377

[56] References Cited

U.S. PATENT DOCUMENTS

| | | | |
|---|---|---|---|
| 2,495,286 | 1/1950 | Brubaker | 428/421 |
| 3,694,412 | 9/1972 | Nozaki | 260/63 |
| 4,434,258 | 2/1984 | Schumacher | 524/15 |
| 4,520,169 | 5/1985 | Hagman | 525/185 |
| 4,618,630 | 10/1986 | Knobel | 524/39 |

FOREIGN PATENT DOCUMENTS

| | | |
|---|---|---|
| 121965 | 6/1984 | European Pat. Off. . |
| 181014 | 10/1985 | European Pat. Off. . |
| 1081304 | 8/1967 | United Kingdom . |

OTHER PUBLICATIONS

Rubber World's "Materials and Compounding Ingredients for Rubber" p. 329, 1975.

Kirk-Othmer, Encyclopedia of Chemical Technology, 2nd Ed., vol. 10, pp. 654 et seq. (1966).

*Primary Examiner*—John C. Bleutge
*Assistant Examiner*—David Buttner
*Attorney, Agent, or Firm*—Dean F. Vance

[57] ABSTRACT

Non-miscible blends comprising, as a major component, a linear alternating polymer of carbon monoxide and at least one ethylenically unsaturated hydrocarbon and, as a minor component, a poly(alkylene oxide) polymer, exhibit improved processability.

8 Claims, No Drawings

POLYMER BLEND

FIELD OF THE INVENTION

This invention relates to an improved polymer blend comprising predominantly a linear alternating polymer of carbon monoxide and at least one ethylenically unsaturated hydrocarbon. More particularly, the invention relates to blends of the linear alternating polymer with an alkylene oxide polymer.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. Pat. No. 1,081,304 produced similar polymers of higher carbon monoxide content in the presence of alkylphosphine complexes of palladium as catalyst. Nozaki extended the process to produce linear alternating polymers by the use of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, e.g., ethylene or ethylene and propylene, has become of greater interest in part because of the greater availability of the polymers in quantity. These polymers, often referred to as polyketones or polyketone polymers, have been shown to be of the repeating formula —CO—(A)— wherein A is the moiety of ethylenically unsaturated hydrocarbon polymerized through the ethylenic unsaturation. By way of further illustration, when the unsaturated hydrocarbon is ethylene, the polymer is represented by the repeating formula —CO—(CH$_2$—CH$_2$)—. The general process for the more recent preparation of such polymers is illustrated by a number of Published European patent application Nos. including 121,965 and 181,014. The process typically involves a catalyst composition formed from a compound of a Group VIII metal selected from palladium, cobalt or nickel, the anion of a strong non-hydrohalogenic acid and a bidentate ligand of phosphorus, arsenic or antimony.

The resulting polymers are relatively high molecular weight thermoplastics having established utility in the production of shaped articles such as containers for the food and drink industry and internal and external parts for the automotive industry. The articles are produced by processing the polymer by conventional methods. For some particular applications it has been found desirable to have properties for a polymeric composition which are somewhat different from those of the polyketone polymers. It would be of advantage to retain the desirable properties of the polyketone polymer and yet improve other properties. These advantages are often obtained through the provision of a polymer blend.

SUMMARY OF THE INVENTION

The present invention contemplates the provision of blends of linear alternating polymer of carbon monoxide and certain other polymeric material. More particularly, according to the invention, there are provided blends of the linear alternating polymer with a polymer of alkylene oxide. Such blends exhibit improved processability as compared to the unblended linear alternating polymer.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other alpha-olefins including propylene, butylene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, m-propylstyrene and p-ethylstyrene. Preferred polyketone polymers are copolymers of carbon monoxide and ethylene or terpolymers of carbon monoxide, ethylene and a second hydrocarbon of at least 3 carbon atoms, particularly an alpha-olefin such as propylene.

The structure of the polyketone polymers is that of a linear alternating polymer of carbon monoxide and ethylenically unsaturated hydrocarbon and the polymer will contain substantially one molecule of carbon monoxide for each molecule of unsaturated hydrocarbon. When terpolymers of carbon monoxide, ethylene and a second hydrocarbon are employed in the blends of the invention, there will be at least two units incorporating a moiety of ethylene for each unit incorporating a moiety of the second hydrocarbon. Preferably there will be from about 10 units to about 100 units incorporating an ethylene moiety for each unit incorporating a unit of the second hydrocarbon. The polymer chain is therefore represented by the repeating formula $$-[CO-(CH_2-CH_2)]_x-[CO-(G)]_y-$$

wherein G is the moiety obtained by polymerization of the second ethylenically unsaturated hydrocarbon through the ethylenic unsaturation. The —CO—(CH$_2$—CH$_2$)— units and the —CO—(G)— units are found randomly along the polymer chain and the ratio of y:x is no more than about 0.5. In the modification of the invention where copolymer of carbon monoxide and ethylene is employed as a blend component, there will be no second hydrocarbon present and the polymer is represented by the above formula wherein y is 0. When y is other than 0, i.e., terpolymers are employed, ratios of y:x from about 0.01 to about 0.1 are preferred. The end groups or "caps" of the polymer chain will depend upon what materials are present during the preparation of the polymer and whether and how the polymer is purified. The precise properties of the polymer will not depend upon the particular end groups to any considerable extent so that the polymer is fairly represented by the above formula for the polymeric chain. Of particular interest are the polyketones of number average molecular weight from about 1,000 to about 200,000, particularly those of number average molecular weight from about 20,000 to about 90,000, as determined by gel permeation chromatography (GPC). The physical properties of the polymer will depend in part on the molecular weight, whether the polymer is a copolymer or a terpolymer and, in the case of terpolymers, the proportion of second hydrocarbon present. Typical melting points of the polymers will be from about 175° C. to about 300° C., more often from about 210° C. to about 270° C. The polymers will have limiting viscosity numbers (LVN), measured in a standard capillary viscosity measuring device in m-cresol at 60° C., of from about 0.4 to about 10, preferably from about 0.8 to about 4.

A method of preparing the polyketone polymers which is now becoming conventional is to contact the carbon monoxide and unsaturated hydrocarbon(s) in the presence of a catalyst composition formed from a palladium compound, the anion of a non-hydrohalogenic acid having a pKa below about 6, preferably below about 2, and a bidentate phosphorus ligand. The scope of the polyketone preparation is extensive but, without wishing to be limited, a preferred palladium compound is a palladium carboxylate, preferably palladium acetate, a preferred anion is the anion of p-toluenesulfonic acid or trifluoroacetic acid and a preferred bidentate phosphorus ligand is 1,3-bis(diphenylphosphino)propane or 1,3-bis[di(2-methoxyphenyl)phosphino]propane.

Polymerization is conducted in a gas phase in the substantial absence of reaction diluent or in a liquid phase in the presence of a reaction diluent such as a lower alkanol, e.g., methanol or ethanol. The reactants are contacted under polymerization conditions in the presence of the catalyst composition by conventional methods such as by shaking or stirring in a suitable reaction vessel. Typical reaction temperatures are from about 20° C. to about 150° C., more typically from about 35° C. to about 150° C. Suitable reaction pressures are from about 1 bar to about 200 bar, preferably from about 10 bar to about 100 bar. Subsequent to reaction the polymer product is recovered by conventional procedures such as filtration or decantation. The polymer product may contain residues of the catalyst composition which are removed, if desired, by treatment with a solvent or a complexing agent which is selective for the residues.

The minor component of the blends of the invention is a polymer of at least one alkylene oxide, which polymer is terminated at both ends with hydroxyl groups. The polymer can be viewed as a polymer of an alkylene oxide or of an alkylene glycol and can be prepared from either the oxide or the glycol. For purposes of illustration, the polymer as described herein will be termed a hydroxyl-terminated poly(alkylene oxide), regardless of the method of its preparation. A preferred class of such polymers is represented by the formula

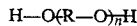

wherein R is alkylene of from 2 to 6 carbon atoms inclusive, preferably from about 2 to about 4 carbon atoms inclusive, and n is a number from 4 to about 5,000, preferably from 4 to about 1,000. Most preferably the poly(alkylene oxide) is a low molecular weight polymer or oligomer, where n is a number from 4 to about 500, preferably 4 to about 200, more preferably 4 to about 125. It will be appreciated that, within a given quantity of poly(alkylene oxide) polymer, n may have several values so that n represents an average of the alkylene oxide units in the polymer. Suitable polymers are homopolymeric, that is, each R is the same, or the polymer may contain R groups of varying numbers of carbon atoms and is therefore copolymeric. Suitable alkylene oxides precursors of the polymer component of the blends of the invention are ethylene oxide, propylene oxide, either 1,2- or 1,3- and butylene oxide, 1,2-, 1,3- or 1,4-. The preferred polymers are homopolymers of ethylene oxide or copolymers of ethylene oxide with up to 40 mol % of 1,3-propylene oxide or 1,4-butylene oxide. Homopolymers of ethylene oxide, also called polyethylene glycol or PEG, are particularly preferred.

The poly(alkylene oxide) polymers are conventional and well known in the art. They are produced by contacting an alkylene oxide or mixture of alkylene oxides with water or the corresponding alkylene glycol(s) in the presence of a small amount of a strong base, particularly an alkali metal base such as sodium hydroxide or potassium hydroxide. For a more detailed description of the poly(alkylene oxide) polymers, see Kirk-Othmer, Encyclopedia of Chemical Technology, 2nd Ed., Vol. 10, pp. 654 et seq. (1966). Certain of the poly(alkylene oxide) polymers, particularly those polyethylene glycols termed PEG, are commercial and are marketed by Aldrich Chemical Company under the tradename PEG.

The blends of the invention comprise a mixture of a major proportion of the polyketone polymer and a minor proportion of the poly(alkylene oxide) polymer. The precise percentage of the poly(alkylene oxide) polymer is not critical and amounts of polymer from about 0.5% by weight to about 45% by weight, based on total blend, are satisfactory. Amounts of polymer from about 1% by weight to about 20% by weight on the same basis are preferred.

The method of producing the blend of the polyketone polymer and the poly(alkylene oxide) polymer is not material so long as a relatively uniform mixture of the poly(alkylene oxide) polymer throughout the polyketone polymer is obtained. The polyketone/poly(alkylene oxide) blend is a non-miscible blend with the poly(alkylene oxide) existing as a discrete phase in the polyketone matrix having a phase size from about 4 microns to about 8 micron, more typically on the order of about 6 microns. The blend will not, therefor, be homogeneous but good results are obtained when the distribution of the poly(alkylene oxide) polymer throughout the polyketone polymer is substantially uniform. The method of blending the components is that which is conventional for the blending of non-miscible polymeric materials. In one modification, the materials in particulate form are mixed and passed through an extruder operating at a high RPM to produce the blend as an extrudate. In an alternate modification, the components are blended in a mixing device which exhibits high shear.

The blends of the invention may also include conventional additives such as antioxidants, stabilizers, fillers, fire retardant materials, mold release agents and other substances which increase the processability of the components or modify the properties of the resulting blend. Such additives are added by conventional methods prior to, together with or subsequent to the blending of the polymeric components.

The blends of the invention are characterized by improved processability when compared to the polyketone polymer and are of utility where production of articles by processes involving molten polymer are employed. For example, the blends are processed by conventional techniques such as extrusion or injection molding into sheets, films, fibers, plates or shaped articles having application in the packaging industry, in the production of containers as for food or drink and in the production of internal as well as external parts for automotive application.

The invention is further illustrated by the following Illustrative Embodiments which should not be construed as limiting.

ILLUSTRATIVE EMBODIMENT I

A linear alternating terpolymer of carbon monoxide, ethylene and propylene was prepared in the presence of a catalyst composition formed from palladium acetate, the anion of trifluoroacetic acid and 1,3-bis(diphenylphosphino)propane. The polymer had a melting point of 225° C. and a limiting viscosity number (LVN), when measured in m-cresol at 60° C., of 1.72.

ILLUSTRATIVE EMBODIMENT II

A blend of the polyketone polymer of Illustrative Embodiment I and 9.7% by weight, based on total blend, of a poly(ethylene oxide) polymer having a melting temperature of about 69° C. and a molecular weight of about 5,000 was prepared. The poly(ethylene oxide) polymer was PEG 5000 obtained from Aldrich Chemical Company. The polyketone polymer, the poly(ethylene oxide) polymer and approximately 0.2% by weight, based on total blend, of Irganox 1076, a conventional hindered phenolic antioxidant added to provide background stabilization, were passed through a 15 mm twin screw Baker Perkins extruder. A sample of the terpolymer of Illustrative Embodiment I also containing stabilizer was extruded as a control. The extruder temperature was 240° C. operating under a nitrogen blanket with undried feed. The extruder was operated at maximum RPM to produce a residence time of 0.5 minutes and the extruded strands were passed directly into water. The feed rate for the blend was substantially higher than the feed rate for the control. The resulting blend was non-miscible as evidenced by examination of cold-cut samples, stained with ruthenium tetroxide, under an electron microscope. The poly(alkylene oxide) oligomer was present as a discrete phase having a particle size approximately 6 microns in diameter.

ILLUSTRATIVE EMBODIMENT III

The melt stability of the blend of Illustrative Embodiment II as well as the polyketone polymer from which it was prepared was determined by measuring the consecutive melting points of the blend and the polymer after exposure to elevated temperature. Measurements were made in a Perkin-Elmer DSC 7 differential scanning calorimeter (DSC) which employed samples of the blend or of the polyketone in sealed containers. The pan and contents are heated at a controlled rate, typically 20° C./minute, until the sample has melted. The pan and contents are then cooled until the sample has solidified and then heated, past a second melting point, to 285° C. where the sample is maintained for 10 minutes. The pan and contents are then cooled until the sample has solidified a second time. The melting and crystallization temperature are defined as the temperature at which heat flow reaches a maximum (for melting) or a minimum (for crystallization). Typically the value for the melting point (Tm) will decrease upon repeated melting/solidification as the apparent crystallinity of the sample decreases. The higher the melting point, the higher the degree of crystallinity of the sample undergoing the test. It is also possible to determine through the use of the DSC the magnitude of the first and second heat of melting ($H_1$ and $H_2$) and the first and second heats of crystallization ($C_1$ and $C_2$) for the polyketone polymer in the blend and separately as a control. The values of the DSC measurements for the polyketone in the blend and as a control are shown in Table I. The values for the heats of melting and crystallization are corrected for the amount of poly(ethylene oxide) present in the blend. In the Table, temperatures are measured in °C. and heats are measured in cal/g.

TABLE I

| % by weight oligomer | $Tm_1$ (°C.) | $Tm_2$ (°C.) | $H_1$ | $C_1$ | $H_2$ | $C_2$ |
|---|---|---|---|---|---|---|
| 0 | 230 | 224 | 223 | 17.2 | 18.5 | 13.4 |
| 9.7% | 239 | 220 | 212 | 18.0 | 21.1 | 9.8 |

What is claimed is:

1. A composition comprising a non-miscible blend of, as a major component, a linear alternating polymer of carbon monoxide and at least one ethylenically unsaturated hydrocarbon and, as a minor component, a hydroxyl-terminated poly(alkylene oxide) polymer, wherein
   (a) the linear alternating polymer consists essentially of recurring units represented by the formula

   $$-[CO-(CH_2-CH_2)]_x[CO-(G)]_y-$$

wherein G is the moiety of an ethylenically unsaturated hydrocarbon of 3 to 20 carbon atoms inclusive polymerized through the ethylenic unsaturation and the ratio of y:x is no more than about 0.5, and
   (b) the hydroxyl-terminated poly(alkylene oxide) polymer is represented by the formula

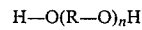
   $$H-O(R-O)_nH$$

wherein R is alkylene of from 2 to 6 carbon atoms inclusive and n is a number from about 4 to about 500.

2. The composition of claim 1 wherein the hydroxyl-terminated poly(alkylene oxide) polymer comprises about 0.5% to about 45% by weight of the blend.

3. The composition of claim 1 wherein n is 4 to about 200.

4. The composition of claim 1 wherein y is 0.

5. The composition of claim 1 wherein G is a moiety of propylene.

6. The composition of claim 5 wherein the hydroxyl-terminated poly(alkylene oxide) polymer is a homopolymer of ethylene oxide or a copolymer of ethylene oxide and up to 40% by weight based on total polymer of 1,3-propylene oxide or 1,4-butylene oxide.

7. The composition of claim 6 wherein the ratio of y:x is from about 0.01 to about 0.1.

8. The composition of claim 7 wherein the hydroxyl-terminated poly(alkylene oxide) polymer is hydroxyl-terminated poly(ethylene oxide).

* * * * *